US012104354B2

(12) United States Patent
Pennagaram Hemanth et al.

(10) Patent No.: US 12,104,354 B2
(45) Date of Patent: Oct. 1, 2024

(54) SYSTEM, APPARATUS, AND METHOD TO SELECT AND APPLY ROUTE PROPERTIES OF A MINE SITE

(71) Applicant: Caterpillar Underground Mining Pty. Ltd., Tasmania (AU)

(72) Inventors: Pradeep Kumar Pennagaram Hemanth, Chennai (IN); Karthikeyan S, Chennai (IN)

(73) Assignee: Caterpillar Underground Mining Pty. Ltd., Tasmania (AU)

( * ) Notice: Subject to any disclaimer, the term of this patent is extended or adjusted under 35 U.S.C. 154(b) by 243 days.

(21) Appl. No.: 17/715,864

(22) Filed: Apr. 7, 2022

(65) Prior Publication Data

US 2022/0325500 A1    Oct. 13, 2022

(30) Foreign Application Priority Data

Apr. 8, 2021    (AU) ................................ 2021202152

(51) Int. Cl.
*E02F 9/20*    (2006.01)
*G05D 1/00*    (2006.01)
*G05D 1/02*    (2020.01)

(52) U.S. Cl.
CPC ............ *E02F 9/2045* (2013.01); *E02F 9/205* (2013.01); *E02F 9/2054* (2013.01); *G05D 1/0016* (2013.01); *G05D 1/0044* (2013.01); *G05D 1/0212* (2013.01)

(58) Field of Classification Search
CPC ....... E02F 9/2045; E02F 9/205; E02F 9/2054; E02F 9/262; G05D 1/0016; G05D 1/0044; G05D 1/0212; G05D 1/0274
See application file for complete search history.

(56) References Cited

U.S. PATENT DOCUMENTS

| 5,548,516 | A | 8/1996 | Gudat et al. |
| 6,064,926 | A * | 5/2000 | Sarangapani ........ G05D 1/0289 |
| | | | 701/414 |
| 8,583,361 | B2 | 11/2013 | Lewis et al. |
| 9,766,637 | B2 | 9/2017 | Kou et al. |
| 9,958,865 | B2 * | 5/2018 | Hoskeri ................. G01S 19/01 |
| 10,145,702 | B2 * | 12/2018 | Gerlach ............... G01C 21/362 |
| 10,302,439 | B2 * | 5/2019 | Sakai ................. G01C 21/3676 |

(Continued)

FOREIGN PATENT DOCUMENTS

AU            750722 B2    7/2002
AU       2017204277 A1    2/2018
(Continued)

*Primary Examiner* — Tyler J Lee

(57) ABSTRACT

A system, method, and apparatus can access, via a user interface, route properties of a mine site used for controlling one or more work machines as the work machine(s) travel through the mine site. Access regarding the route properties can include viewing one or more of the properties and/or setting requirements (e.g., restrictions or limitations) for one or more of the properties. A candidate route can be selected, validated, and set as a selected route using the user interface to access route properties associated with the selected route. Requirements can be set for one or more of the route properties using the user interface. The work machines can be controlled to traverse the mine site according to the requirements set for the route properties.

20 Claims, 5 Drawing Sheets

(56) References Cited

U.S. PATENT DOCUMENTS

| | | | |
|---|---|---|---|
| 10,520,320 B2 | 12/2019 | Atsushi et al. | |
| 11,788,254 B2 * | 10/2023 | Aizawa | E02F 9/2296 701/50 |
| 2002/0099481 A1 * | 7/2002 | Mori | G05D 1/027 318/587 |
| 2013/0238182 A1 * | 9/2013 | Osagawa | G05D 1/0278 701/26 |
| 2014/0039792 A1 | 2/2014 | Seetharam | |
| 2015/0112537 A1 * | 4/2015 | Kawamata | B60P 1/283 701/23 |
| 2015/0142258 A1 | 5/2015 | Sugihara | |
| 2017/0279957 A1 * | 9/2017 | Abramson et al. | G06F 21/36 |
| 2020/0392701 A1 | 12/2020 | Aizawa et al. | |

FOREIGN PATENT DOCUMENTS

| | | |
|---|---|---|
| CL | 201400774 | 1/2014 |
| JP | 3689070 B2 | 8/2005 |
| JP | 2015194924 A | 11/2015 |
| WO | 2020109462 | 4/2020 |

* cited by examiner

SYSTEM, APPARATUS, AND METHOD TO SELECT AND APPLY ROUTE PROPERTIES OF A MINE SITE

TECHNICAL FIELD

The present disclosure relates to accessing properties for control of work machines operating at a mine site, and more particularly to systems, methods, and apparatuses to select and apply route properties for operation of work machines at the mine site when the work machines traverse the route(s).

BACKGROUND

For a mine site, such as an underground mine site, work machines moving through passages or paths of the mine site may need to adhere to certain operational requirements, particularly when operating autonomously (e.g., full or partial) or under control of an operator controlling the work machine remotely. Such operational requirements may be specific to particular portions of a passage, including the direction of traversing the passage, and may need to be updated, for instance, due to changing physical conditions of the passage or otherwise. However, an administrator for the mine site may not have a way suitably to either identify approved route portions or segments through the passages of the mine site or select and set certain operational requirements for an entirety of or select portions of the passages.

Japanese Patent Document JP 2015-194924 ("the JP '924 Patent Document") is understood to describe providing a map editing system for a work machine that can keep a value, which is input in connection with map data for autonomously running the work machine when creating the map data, with an appropriate range from a perspective of work efficiency. However, the JP '924 Patent Document is not understood to describe validating a candidate route to set valid portions of the candidate route as a selected route and accessing travel restrictions or requirements for the working machines to adhere as the working machines traverse the selected route.

SUMMARY

According to an aspect a system for selecting and applying route requirements for work machines traversing passages of an underground mine is disclosed or implemented. The system can comprise: a graphical user interface to receive inputs from a user and display mappings of the underground mine including the passages; and control circuitry, operative with the graphical user interface. The control circuitry can be configured to responsive to input to the graphical user interface by the user selecting a candidate route through one or more of the passages displayed on the graphical user interface, determine, in real time, whether any portion of the candidate route is invalid based on prior knowledge of valid nodes and interconnections between adjacent ones of the valid nodes associated with the candidate route and rejecting any portion of the candidate route determined to be invalid, set as a selected route all portions of the candidate route determined to be valid by way of exclusion of said any portion of the candidate route determined to be invalid, responsive to input to the graphical user interface by the user to modify at least one of the route requirements, control display, in real time, of the modified at least one route requirement on the graphical user interface, and responsive to input to the graphical user interface by the user to confirm the modified at least one route requirement, set the modified at least one route requirement as part of current route requirements for the work machines traversing the selected route.

In another aspect, a method for selecting and applying route requirements for work machines traversing predetermined passages of a mine site is disclosed or implemented. The method can comprise selecting, via a user interface provided on a display of a mobile, handheld mine site tool, a candidate route through one or more of the predetermined passages of the mine site displayed on a map of the mine site; validating, using a processor of the mobile, handheld mine site tool, the candidate route based on prior knowledge of valid nodes and edges between adjacent ones of the valid nodes associated with the candidate route; setting as a selected route, using the processor of the mobile, handheld mine site tool, only portions of the candidate route determined to be valid; and controlling display of, on the display of the mobile, handheld mine site tool, using the processor of the mobile, handheld mine site tool, a modified route requirement for one of the plurality of route requirements for the selected route responsive to selection and setting of the route requirement in response to input via the user interface. The modified route requirement displayed on the display of the mobile, handheld mine site tool can be displayed as an overlay on the map and shows individual indicia for the route requirement on each of the valid edges of the selected route.

And in another aspect a non-transitory computer-readable storage medium having stored thereon instructions that, when executed by one or more processors, cause the one or more processors to perform a method is disclosed or provided. The method can comprise processing an input to a graphical user interface to select a candidate route through one or more of the passages of a mine site displayed on a map of the mine site; determining whether any portion of the candidate route is invalid based on prior knowledge of nodes and interconnections between adjacent ones of the nodes associated with the candidate route; setting as a selected route all portions of the candidate route determined to be valid; controlling display of, on the graphical user interface, an option to set one or more of a plurality of route requirements to control operation of work machines according to the route requirements when the work machines traverse the selected route; and controlling display of, on the graphical user interface, at least one of the one or more route requirements set in response to input via the graphical user interface. The set at least one of the route requirements can be displayed on the graphical user interface as an overlay on the map for each of the interconnections of the selected route.

Other features and aspects of this disclosure will be apparent from the following description and the accompanying drawings.

DETAILED DESCRIPTION

The present disclosure relates to accessing properties for control of work machines operating at a mine site, and more particularly to systems, methods, and apparatuses to select and apply route properties for operation of work machines at the mine site when the work machines traverse the route(s). Thus, embodiments of the disclosed subject matter can comprise, i.e., include, systems, methods, and/or apparatuses to access, i.e., select, view, and/or apply or set route properties for operating the work machines at the mine site when the work machines traverse the route or routes associated with the route properties.

Figure 1:
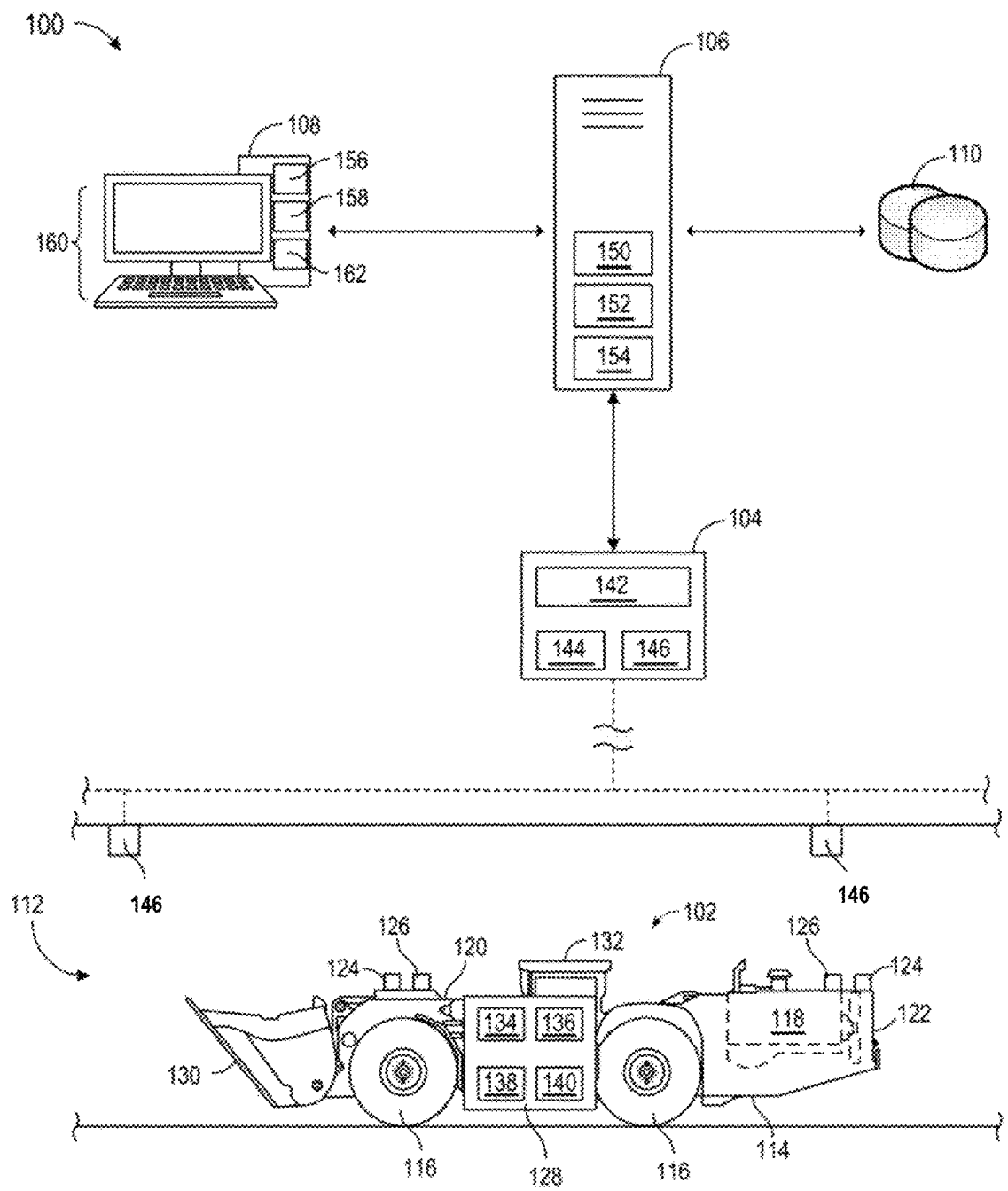
FIG. 1 shows an exemplary system according to one or more embodiments of the disclosed subject matter can be implemented.

Referring now to FIG. 1, FIG. 1 shows an exemplary system 100 according to one or more embodiments of the disclosed subject matter. The system 100 can include a control station 108. The system 100 may also include a localization platform 106, communication infrastructure 104, and a storage device 110. The localization platform 106 and/or the storage device 110 may be part of or characterized as a server. According to one or more embodiments, one or more work machines 102, for instance, a mining machine as shown in FIG. 1, can be part of the system 100. The foregoing components of the system 100 can be provided relative to a mine site, for instance, respectively outside or inside a passage or tunnel 112 in the case of the passage being in an underground portion of the mine site. For instance, the control station 108 may be outside of an underground mine, either aboveground at the mine site or remote from the mine site.

Among other operations, system 100 can be used for the control of operation of the work machine 102, particularly when the work machine 102 is operating autonomously (e.g., fully autonomous or partially autonomously under partial operator control) and/or under full control of an operator controlling the work machine 102 remotely. In this regard, discussed in more detail below, the system 100 can, according to embodiments of the disclosed subject matter, provide control inputs via the control station 108 for controlling the work machine 102 according to one or more route properties for particular portions of the mine site (including all of the mine site) when the work machine 102 traverses the portions of the mine site.

According to one or more embodiments, control signaling may be sent from the control station 108 directly to each work machine 102 or via communication infrastructure 104 by way the localization platform 106 prior to the work machine 102 traversing the mine site (or at least prior to reaching a particular portion of the mine site). Hence, control of the work machine 102 according to embodiments of the disclosed subject matter can involve non-real time control, at least for the control inputs regarding the one or more route properties.

The work machine 102, which as noted above can be a mining machine, is shown in FIG. 1 as merely an example of but one work machine 102 according to embodiments of the disclosed subject matter. The work machine 102 can include a frame 114, traction elements 116, an engine 118, a front section 120, a rear section 122, one or more mobile ranging devices 124, one or more movement sensor devices 126, and a controller 128. Traction elements 116 may include wheels, tracks, and/or the like that are movably coupled to frame 114 and caused to be driven by engine 118. Front section 120 may be coupled to a front portion of frame 114 and configured to movably support an implement 130 (e.g., a bucket and/or another work tool) of work machine 102. Rear section 122 may be coupled to a rear portion of frame 114 and configured to support engine 118 and an operator cab 132 (though in some embodiments the operator cab 132 may be omitted because the work machine 102 can be a fully autonomous work machine, though on the other hand fully autonomous work machines may not necessarily be without the operator cab 132). Front section 120 and rear section 122 may be rigidly coupled together via frame 114 or pivotally joined about one or more articulated joints. In some examples, work machine 102 may be a load, haul, and dump (LHD) machine and/or another mining machine suited to transport material within a mining site (e.g., tunnel 112).

Mobile ranging device 124 can be or include a device configured to transmit and/or receive a proximity signal relating to a location of work machine 102. For example, mobile ranging device 124 may include a radio frequency identification (RFID) tag (e.g., a passive RF tag, an active RF tag, and/or the like) that is configured to electromagnetically interact with one or more RFID readers and generate a proximity signal that can be used to determine a range or a location of the RFID tag relative to the RFID readers. Movement sensor device 126 can include a device configured to measure a movement of work machine 102 relative to a frame of reference of the work machine 102. For example, movement sensor device 126 may include an accelerometer, a gyroscope, a magnetometer, a barometer, an inertial measurement unit (IMU), and/or another sensor device that can be used to detect a change in a position of work machine 102, a change in an orientation of work machine 102, and/or another type of movement of work machine 102 relative to one or more axes of work machine 102. In some examples, movement sensor device 126 may be configured to determine an acceleration (e.g., a horizontal acceleration and/or a vertical acceleration), a yaw rate, a yaw angle, a pitch, and/or a roll of work machine 102.

The mobile ranging device 124 may be implemented in association with control aspects of embodiments of the present disclosure to control the work machine 102, according to location within the mine site, and one or more route properties set using the control station 108. That is, the location of the work machine 102 within the mine site, based on position identification performed, at least in part, by the mobile ranging device 124, can be used to identify corresponding one or more route properties applicable for the work machine 102 for the particular position of the work machine 102 as the work machine 102 traverses the mine site. Here, as alluded to above, the control regarding setting of the one or more route properties using the control station 108 can occur prior to the work machine 102 traversing the mine site (or at least prior to reaching a particular portion of the mine site), and may be characterized as non-real time control, whereas the control of the work machine 102 according to the one or more route properties can be performed in real time by application of the one or more route properties to the operation of the work machine 102 as the work machine 102 traverses the mine site.

Controller 128 can include a processor 134, a memory 136, and a communication device 140. Optionally, controller 128 can include or otherwise be operative with a user interface 138. Processor 134, which can include one or more processors, can be implemented in hardware, firmware, and/or a combination of hardware and software capable of being programmed to perform one or more functions or operations associated with work machine 102. Memory 136 can include a random-access memory (RAM), a read only memory (ROM), and/or another type of dynamic or static storage device that stores information and/or instructions to be performed by the processor 134. According to one or more embodiments of the disclosed subject matter, the memory 136 may store route properties (e.g., requirements such as restrictions or limitations) set by the control station 108 for retrieval by the controller 128 to control operation of the work machine 102 according to the route properties when the work machine 102 traverses passages 112 of the mine site.

The optional user interface 138, which may be provided in a case where local manual control of the work machine 102 via an operator riding in the work machine 102, can include an input device and an output device enabling an operator of the work machine 102 to specify an instruction, a command, and/or another parameter for operating work machine 102. Of course, the user interface 138 may still be provided even in a case where the work machine 102 operates entirely autonomously. In some examples, the user interface 138 may enable the operator of work machine 102 to access a visual model and/or a map of passage 112, access a visual model and/or a map of a site plan of a mining operation, monitor a progress of the mining operation, monitor an efficiency and/or a production rate of the mining operation, track a location of work machine 102, track a location of another work machine, access a record of completed tasks and/or historic events associated with work machine 102, and/or the like.

Communication device 140, which may be referred to as or include communication circuitry 140 of the work machine 102, can include a wireless local area network (WLAN) component (e.g., a Wi-Fi component), a radio frequency (RF) communication component (e.g., a Bluetooth component), and/or the like. Communication device 140 may enable communication between the work machine 102, the communication infrastructure 104, the localization platform 106, the control station 108, the storage device 110, and/or one or more other work machines. Communication device 140 may enable processor 134 to receive location data relating to a location of work machine 102 relative to passage 112 (e.g., from communication infrastructure 104), coordinate data relating to a geography of passage 112 (e.g., from network storage device 110), a site plan of a mining operation (e.g., from network storage device 110), and/or the like. Communication device 140 may enable processor 134 to transmit location data (e.g., determined using mobile ranging device 124) and/or movement data (e.g., determined using movement sensor device 126) to communication infrastructure 104, localization platform 106, control station 108, network storage device 110, one or more other work machines.

In some implementations, the communication device 140 may provide to the processor 134 control signaling from the control station 108 for operating work machine 102. For example, communication device 140 may provide to the processor 134, from the control station 108, one or more route properties (e.g., requirements such as restrictions or limitations) set by the control station 108 to control operation of the work machine 102 according to the route properties when the work machine 102 traverses passages 112 of the mine site. As another example, the communication device 140 may provide to the processor 134, from the control station 108, a start command, a stop command, a machine speed command, a travel direction command, a command for operating implement 130, and/or the like. According to one or more embodiments, the route properties and the real time control of the work machine 102 may be performed by different control stations 108.

Communication device 140 may also provide to processor 134 location data corresponding to a location of another work machine, and/or transmit a location of another work machine to communication infrastructure 104, localization platform 106, control station 108, and/or storage device 110. In some examples, communication device 140 may receive and/or transmit data used in association with user interface 138 (e.g., information relating to a visual model and/or a map of tunnel 112, a visual model and/or a map of a site plan of a mining operation, a progress of the mining operation, an efficiency and/or a production rate of the mining operation, a location of work machine 102, a location of another work machine, a record of completed tasks and/or historic events associated with work machine 102, and/or the like).

Communication infrastructure 104 may include a processor 142, a memory 144, and communication circuitry 146, which may include transmitters and receivers (including transceivers) provide throughout the mine site, including throughout passages thereof, such as passage 112. FIG. 1, for instance, shows transceiver devices 146 (as part of the communication circuitry) provided on a ceiling of the passage 112 for communication with the work machines 112 as the work machines 112 travel through the passages 112. Processor 142 can be implemented in hardware, firmware, and/or a combination of hardware and software capable of being programmed to perform a function associated with a mining operation. Memory 144 can include a RAM, a ROM, and/or another type of dynamic or static storage device that stores information and/or instructions to be performed by processor 142. Communication circuitry 146 can include a WLAN component (e.g., a Wi-Fi component), an RF communication component (e.g., a Bluetooth component), and/or the like. Communication circuitry 146 may enable the communication infrastructure 104 to communicate with work machine 102, the localization platform 106, the control station 108, the storage device 110, and/or another work machine. For example, communication circuitry 146 may be operative with processor 142 to transmit location data relating to a location of work machine 102 relative to passage 112 to the localization platform 106, the control station 108, the storage device 110, and/or another work machine. In some examples, communication infrastructure 104 may send to the work machines 102 one or more route properties (e.g., requirements such as restrictions or limitations) set by the control station 108 to control operation of the work machines 102 according to the route properties when the work machine 102 traverses the passages 112 of the mine site. Such sending may include sending the one or more route properties to the work machines 102 for storage locally at the work machines 102 prior to the work machines 102 traversing the passages 112 and/or sending control signaling to control the work machines 102 in real time based on the one or more route properties as the work machines 102 traverse the passages 112.

As further shown in FIG. 1, localization platform 106 can include a processor 150, a memory 152, and communication circuitry 154. Processor 150 can be implemented in hardware, firmware, and/or a combination of hardware and software capable of being programmed to perform a function associated with locating and/or identifying a task of work machine 102. Memory 152 can include a RAM, a ROM, and/or another type of dynamic or static storage device that stores information and/or instructions to be performed by processor 150. Communication circuitry 154 can include a WLAN component (e.g., a Wi-Fi component), an RF communication component (e.g., a Bluetooth component), and/or the like. Communication circuitry 154 may be operative with processor 150 to receive data relating to passage 112 from storage device 110, receive location data relating to a location of work machine 102 within passage 112 from communication infrastructure 104, receive movement data from movement sensor device 126 of work machine 102, and transmit information relating to the location and/or a task of work machine 102 to work machine 102, communication infrastructure 104, control station 108, storage device 110, and/or another work machine. In some examples, localization platform 106 may send to the work machines 102 one or more route properties (e.g., requirements such as restrictions or limitations) set by the control station 108 to control operation of the work machines 102 according to the route properties when the work machine 102 traverses the passages 112 of the mine site. Such sending may include sending the one or more route properties to the work machines 102 for storage locally at the work machines 102 prior to the work machines 102 traversing the passages 112 and/or sending control signaling to control the work machines 102 in real time based on the one or more route properties as the work machines 102 traverse the passages 112.

As further shown in FIG. 1, the storage device 110 can include one or more devices capable of storing, processing, and/or routing information. Storage device 110 may include, for example, a server device, a device that stores a data structure, a device in a cloud computing environment or a data center, and/or the like. In some examples, storage device 110 may include a communication interface that allows the storage device 110 to receive information from and/or transmit information to controller 128 of work machine 102, communication infrastructure 104, localization platform 106, control station 108, and/or another work machine. In some examples, storage device 110 may store coordinate data relating to a geography of passage 112 and/or particular attributes of passage 112 (e.g., one or more drawpoints of passage 112 and/or the like). In some examples, storage device 110 may store information relating to a visual model and/or a map of passage 112, a visual model and/or a map of a site plan, a progress of a mining operation, an efficiency and/or a production rate of the mining operation, a location of work machine 102, a location of another work machine, a record of historic tasks and/or events associated with work machine 102, and/or the like.

Though communication infrastructure 104 is termed infrastructure and may be provided, at least in part, at the mine site, embodiments of the disclosed subject matter are not so limited to this feature being the sole so-called infrastructure features. For example, some or all of the localization platform 106, some or all of the storage device 110, and/or some or all of the control station 108 may be referred to or characterized as infrastructure of the mine site.

The control station 108 can include a processor 156, a memory 158, a user interface 160, and communication circuitry 162. Processor 156 can be implemented in hardware, firmware, and/or a combination of hardware and software capable of being programmed to perform a function associated with a mining operation. Memory 158 can include a RAM, a ROM, and/or another type of dynamic or static storage device that stores information and/or instructions to be performed by processor 156. User interface 160 can include an input device and an output device enabling an operator or user (e.g., an operator that is local or remote to the mine site) to specify instructions, command, and/or one or more parameters (e.g., one or more route properties) for operating work machine 102. In some examples, the user interface 160 may enable the user to access a visual model and/or a map of passage 112, access a visual model and/or a map of a site plan of a mining operation, monitor a progress of the mining operation, monitor an efficiency and/or a production rate of the mining operation, track locations of the work machines 102, access a record of completed tasks and/or historic events associated with work machines 102, and/or the like. Discussed in more detail below, the control station 108 can be used by the user to send the one or more route properties for controlling the work machines 102 prior to the work machines 102 traversing the passages 112 and/or to send control signaling to control the work machines 102 in real time based on the one or more route properties as the work machines 102 traverse the passages 112.

Communication circuitry 162 can include a WLAN component (e.g., a Wi-Fi component), an RF communication component (e.g., a Bluetooth component), and/or the like, and can enable communication with work machine 102, communication infrastructure, localization platform 106, network storage device 110, and/or another work machine. Communication circuitry 162 may be operative with the processor 156 to receive location data of work machine 102, movement data of work machine 102, coordinate data of passage 112, a site plan, and/or the like. In some examples, communication circuitry 162 may be operative with the processor 156 to transmit control signaling for operating work machine 102 (e.g., a start command, a stop command, a machine speed command, a travel direction command, a command for operating implement 130, and/or the like). In some examples, communication circuitry 140 may be operative with the processor 156 to receive and/or transmit information relating to a visual model and/or a map of passage 112, a visual model and/or a map of a site plan, a progress of a mining operation, an efficiency and/or a production rate of the mining operation, a location of work machine 102, a location of another work machine, a record of completed tasks and/or historic events associated with work machine 102, and/or the like. The communication circuitry 162 can also output the one or more route properties for controlling the work machines 102 prior to the work machines 102 traversing the passages 112 and/or the control signaling to control the work machines 102 in real time based on the one or more route properties as the work machines 102 traverse the passages 112.

The user interface 160 can include a display (e.g., a touch screen display) and a control device to provide inputs to the user interface 160. For instance, the inputs can be provided by way of a mouse device and keyboard manipulated by a user's hands to control a pointer on the display and keystrokes to enter data. For instance, as shown in FIG. 1, the user interface 160 can be part of a personal computer (or the like) and corresponding peripherals, such as the mouse device and keyboard mentioned above. Alternatively, the user interface 160 can be a portal electronic device (e.g., a mobile smart device), such as a mobile phone, a tablet, a personal digital assistance (PDA), or the like. Optionally, such portal devices may be handheld and so-called smart devices. Thus, according to embodiments of the disclosed subject matter the user interface 160 may be characterized as an electronic mobile, handheld mine site tool or a customized industrial display. In this regard, the user interface 160 may include a graphical user interface (GUI) provided on the display of the user interface 160. Thus, the user may provide inputs to the user interface 160 via his or her finger(s) or a stylus, for instance. Optionally, inputs to the user interface 160 may be via voice comments to a built-in microphone of the user interface 160.

Figure 2:
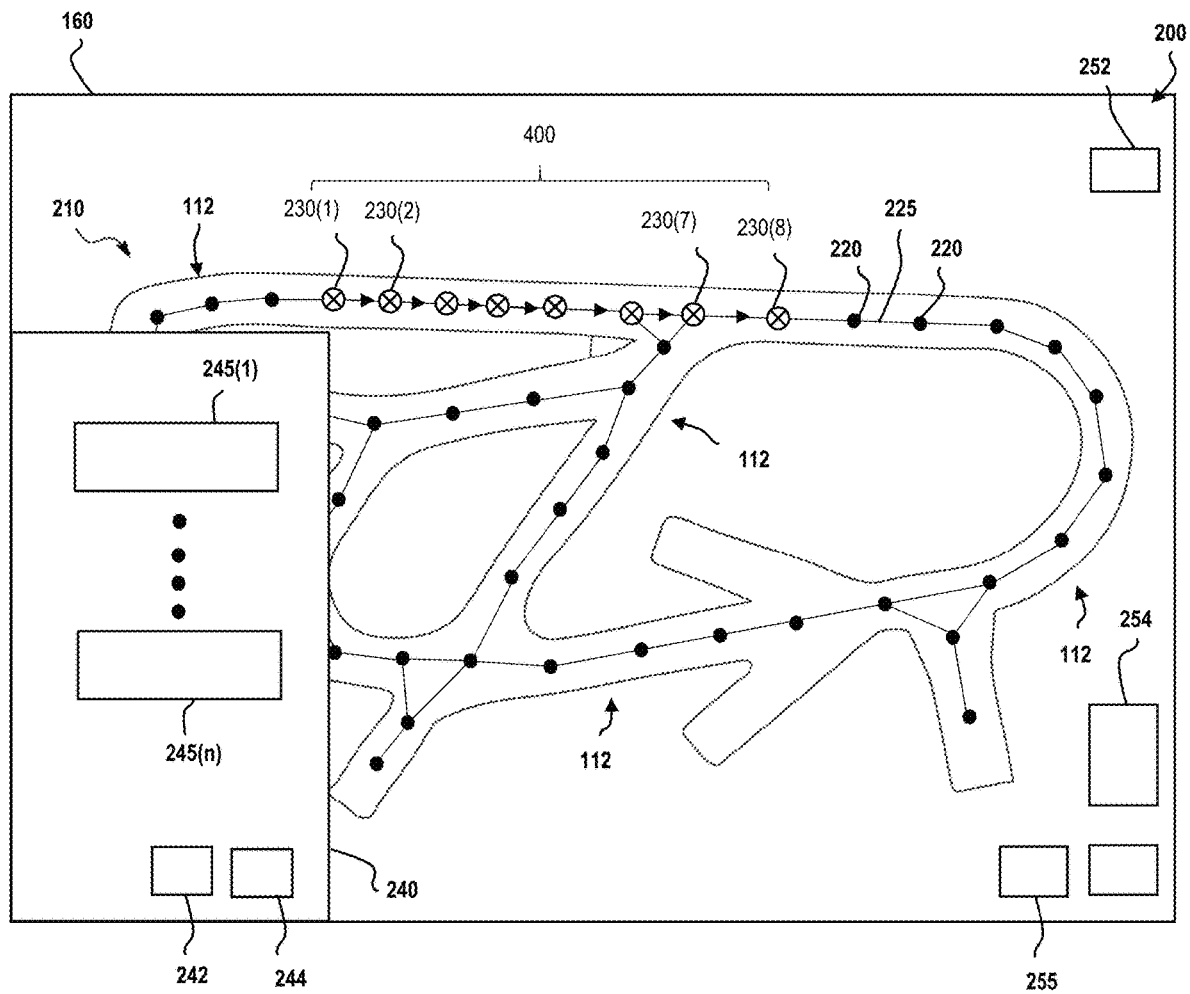
FIG. 2 shows aspects of graphics associated with a mine site provided on a display, according to one or more embodiments of the disclosed subject matter.
Figure 3:
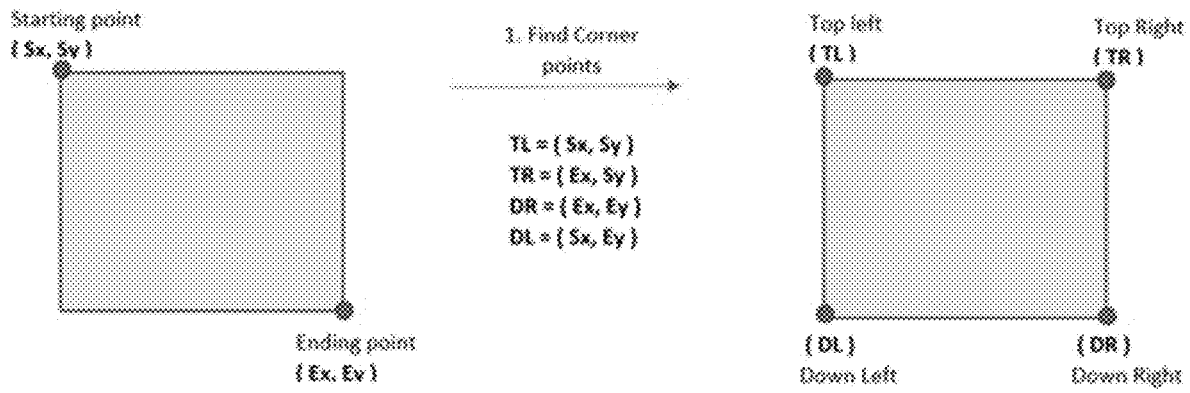
FIG. 3 shows information pertaining to a validation process to validate (or invalidate) portions of a selected route according to one or more embodiments of the disclosed subject matter.
Figure 3:
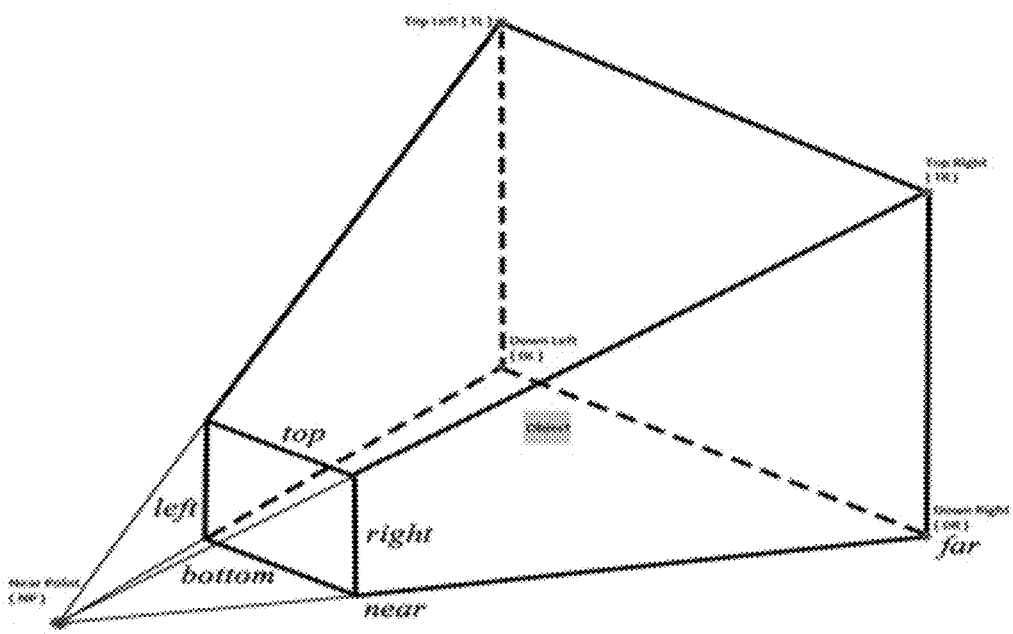

Turning to FIG. 2 and FIG. 3, these figures show various aspects of an exemplary graphic 200, which can be interactive, that may be displayed on a display device of the user interface 160 according to embodiments of the disclosed subject matter. As noted above, the display device can be part of a personal computer or the like or a portal electronic device (e.g., a mobile smart device), such as a mobile phone, a tablet, a personal digital assistance (PDA), or the like.

Notably, the graphic 200 can include a map 210 of some or all of the mine site. The map 210 can represent a part of the mine site desired to be inspected, i.e., from which to obtain data and/or for which to set certain one or more properties for operation of the work machines 102 when the work machines 102 travel through the passages 112 of the mine site. In this regard, input 252, which may be in the form of one or more active icons or buttons, may be selected by a user to control magnification (i.e., zoom in or out) of the map 210. Input 254, which may be in the form of one or more active icons or buttons, may be selected by the user to reposition the focus of the map 210, i.e., what portion of the map is shown in a main (e.g., middle) portion of the graphic 200. Additionally or alternatively, the user may control magnification and/or repositioning using one or more of his or her digits (e.g., pinching to zoom, hold down and drag to reposition, etc.). Thus, embodiments of the disclosed subject matter can allow for the graphic 200 to show a localized view of a desired portion of the mine site, by way of a mapping of the desired portion, as needed, for instance, by way of the input(s) 252 and/or the input(s) 254 or otherwise.

As noted above, the map 210 can be provided on the main portion of the graphic 200, for instance, at a center portion or generally center portion of the graphic 200 and can correspond to the portion of the mine site desired to be inspected. Optionally, a map of the entire mine site may be displayed at all times in another portion of the graphic 200. Optionally, both the map 210 and the entire map can be representative of the entirety of the mine site (i.e., map 210 shows the entire mine site). The mine site, which may be represented entirely or partially as an underground mine, may be comprised of a plurality of different passages 112. In some respects, the passages 112 may be characterized as routes or paths over which work machines, such as work machine 102, can traverse.

The mine site may have been surveyed to identify and define the passages 112. However, the surveyed passages may not (or may not sufficiently) indicate or even include on the map 210 infrastructural qualities not incorporated (or not yet incorporated) into the survey and hence the map 210, such as whether a feature or characteristic associated with the passage(s) 112 has changed since the survey.

According to embodiments of the disclosed subject matter, the user (e.g., mine site supervisor) can access the user interface 160 to define operating modes for the work machines 102 for various portions of the passages 112. For instance, the user interface 160 can be used to define portions of the mine site the work machines 102 are not allowed to enter fully autonomously and/or semi-autonomously. The fully autonomous mode may be referred to or characterized as an autopilot mode. As another example, the user may know that a digging activity is happening at a particular portion of the mine site and may wish to mandate only autonomous operation in this section because manual operation may not provide sufficient precision in operation and hence lead to an unsafe condition.

A digitation graph comprised of a plurality of points through the passages 112 of what the autonomy system (which can include the work machines 102) thinks a route is between two points can be generated by or for the autonomy system and provided on the user interface 160 in the form indicia such as dots 220 as shown in FIG. 2. Interconnections 225 between the dots 220 can be represented by indicia such as straight lines, for instance, as shown in FIG. 2. The dots 220 and the interconnections 225 may be referred to, characterized as and/or correspond to logical nodes 220 and edges 225, respectively, which, discussed in more detail below, can govern the symbolization of the generated route.

According to one or more embodiments, initially, the first time the digitation graph is generated it may be mandated that the user must select or initialize default properties. As such, initially the nodes and edges can be defaulted to a "no travel state," which can be interpreted by the autonomous system (including the work machines 102) as meaning the work machines 102 cannot travel across all such nodes and edges (again, all of them in this case). This can provide a safety mechanism initially so the user can give concurrence for the nodes 220 and edges 225 to apply travel to each of the nodes 220 and edges 225 initially.

As noted above, one or more route properties may be applied to portions of the mine site (e.g., the passages 112) to control the operation of the work machines 102 when the work machines 102 travel about the mine site. In this regard, the one or more route properties may be accessed via the user interface 160. Here, generally, the properties may be requirements set by an operator associated with the mine site (e.g., a supervisor) to give back to the autonomous (full or partial) operation of the work machines 102. Route requirements may include route restrictions or limitations.

Access to the requirements for the route properties can include viewing the requirements. Hence, the user can access the requirements to understand current built-in parameters, if currently any, for autonomous operation of the work machines 102 about the mine site. Such viewing may also be to identify what route properties are even modifiable with requirements for a given part of the mine site or the entirety of the mine site. Access can additionally or alternatively include setting one or more parameters for the requirements for some or all of the mine site, such as some or all of the passages 112 in the mine site shown in FIG. 2. Such setting may also be to apply or remove application of some or all of the requirements. The user interface 160 can be operational to receive inputs in this regard to access the route properties and hence set the requirements for select portions of the mine site (including all of the mine site).

To access the route properties, for the first time or to update one or more of the requirements, the user interface 160 can be accessed to select corresponding nodes 220 and edges 225 for the section or sections of the passages 112. That is, a set of one or more edges 225 can be selected by selecting corresponding nodes 220 at opposite ends of the edges 225. Some or all of the nodes 220 (and edges 225) can be selected.

For instance, all of the nodes 220 (and edges 225) being selected by way of selection of the entire map 210 of the graphic 200 on the user interface 160. Alternatively, only some of the nodes 220 (and edges 225) may be selected. Of course, the nodes 220 (and edges 225) and selection shown in the figures is/are mere examples and any suitable number (e.g., one, more than one, or all) of nodes 220 may be selected, at least as candidate nodes 230.

Regarding selecting all of the nodes 220 (and edges 225), the user can provide an input to the user interface 160 (e.g., finger or stylus on a touch screen) to form a selection in the form of a box around the entire mine site and hence all of the nodes 220 and edges 225. Finishing the selection box can result in the control station 108 determining, via one or more processing algorithms and one or more processors (e.g., including processor 156), which nodes 220 and edges 225 are valid for future access of corresponding one or more route properties (discussed in more detail below). This can result in only valid nodes 220 and edges 225 remaining selected and hence capable of providing access to corresponding one or more route properties. Here, the initial selection box may constitute or be characterized as selecting a candidate route or candidate routes and the resulting valid nodes and edges 225 can constitute or be characterized as a selected candidate route or routes. In this example, the selection can be nodes 220 the user thinks he or she needs to set a property on, for instance, for safety reasons, as noted above, or additional or alternative reasons, such as for noise control, machine longevity, etc., based on characteristics of the passage or passages 112 such as width, traffic, traffic direction (one way or bidirectional), grade, roughness, obstacles, etc. Thus, in a case where the user wishes to access route properties for many nodes 220 and edges 225 of the mine site (e.g., all of them), the ability to select a relatively large number the nodes 220 (and hence edges 225) can be achieved relatively efficiently, for instance, as compared to selecting each node 220 individually.

In contrast to selecting all of the nodes 220 and edges 225, FIG. 2 shows an example of selecting a sequence of only some of the nodes 220. The user, via the interactive graphic 200 provided via the user interface 160, can begin the selection process by selecting the node 230(1) as a first node, followed by node 230(2) in FIG. 2. The selection process can proceed with a selection 400 in the form of a sequence of nodes 230(1) up to node 230(8) as shown in FIG. 2. In this example, the selected nodes 220, i.e., selected nodes 230(1) to nodes 230(8), can be nodes 220 the user thinks he or she needs to set a property on, for instance, for safety reasons, as noted above, or additional or alternative reasons, such as for noise control, machine longevity, etc., based on characteristics of the passage or passages 112 such as width, traffic, traffic direction (one way or bidirectional), grade, roughness, obstacles, etc.

According to one or more embodiments, a direction of selection of the nodes 220 may define, at least initially, a direction of travel for the candidate route, though as discussed below the properties of the route may be set the same for both directions of travel along the route. Here, notably, the edges 225 between the selected nodes 230 can show an arrow corresponding to the direction of selection (to the right in this example). Optionally, selection of the candidate route can be bidirectional, meaning that all properties, including restrictions, can be the same for both directions of travel, at least initially (and in some cases permanently). In such a case the arrows may be bidirectional or even omitted.

Until the nodes 220 and corresponding edges 225 are validated the selection of the nodes 220 (and edges 225) may be characterized as or considered a candidate route or candidate routes, for instance, depending upon the number and positioning and optional directionality associated with the nodes 220 and corresponding edges 225. Thus, though the passages 112 can be shown, along with the dots and lines representative of nodes 220 and edges 225, the user may not inherently know when selecting the candidate route whether the selected candidate route is possible to achieve. In this regard, at the candidate stage the selected candidate route may be characterized as or referred to as an unidentified route.

According to one or more embodiments, the validation process of the nodes 220 and edges 225 can be performed as each successive node 230 or groups of nodes 230 are selected. Only valid nodes 220 and edges 225 may remain selected (i.e., highlighted, for instance, respectively with circles and lines with arrows) on the graphic 200. Thus, invalid nodes 220 and edges 225 may be rejected from the candidate route selection by the user.

FIG. 3 shows information pertaining to a validation process to validate portions of a selected candidate route according to one or more embodiments of the disclosed subject matter. The validation process represented by FIG. 3, which can be implemented via software and/or hardware of the control station 108, such as the processor 156, can be performed for the selected nodes 230 (and corresponding edges 225) individually, and may involve parallel processing of multiple selected nodes 220 and edges 225 at a time, for instance, after an entire portion of the route is selected or processing of the selected nodes 230 and edges 225 as they are selected.

As shown, the validation process can begin by finding corner points surrounding an object, in this case, as an example, either an edge 225 between two nodes 220 or an individual node 220, from a selection having a starting point and an ending point. Planes can be drawn from available coplanar points, i.e., when all four points are known, to try to draw a frustum, such as shown in FIG. 3. Such validation processing, in a sense, can implement a 2-dimensional frustum out of three-dimensional spatial coordinates. This can be followed by a searching of the object inside the box. If the distance between each of the planes and the object is positive, then the object is determined to be within the box. However, if any of the distance between each of the planes and the object is negative, then the object is outside the box. Valid selected nodes 230 and/or valid segments 225 can correspond to the representative object being determined to be inside the box, whereas invalid nodes 220 and/or invalid segments 225 can correspond to the representative object being determined to be outside the box.

Here, the validation process can be performed based on the understanding from prior knowledge of the interconnections 225 between nodes 220 as well as where interconnections 225 between nodes 220 do not exist at all and/or that do not exist for a particular direction of travel. Such prior knowledge can thus determine whether a selection by a user (e.g., selection 400) is possible as part of the validation process. FIG. 2 can be representative of when all nodes 230 (and corresponding edges 225) selected by the user are valid because all of the candidate nodes 230 and edges 225 remain selected, whereas any candidate nodes 230 and edges 225 that are invalidated may be removed from the selection shown in the graphic 200. That is, the validation process can reject the selection by the user for any nodes 230 and edges 225 determined to be invalid (i.e., not valid). According to one or more embodiments, the validation process may be referred to or characterized as validating the route selected by the user using the user interface 160.

By way of example, an invalid node 220 may be when a next node 220 in a selection sequence is not continuous with a most recently selected node 230. For instance, in the case of FIG. 2, after selecting node 230(8) from the direction shown (i.e., left to right) selection of the already selected note 230(7) after selecting node 230(8) may be determined to be an invalid edge 225 between node 230(8) and 230(7)

going in the opposite direction (i.e., right to left). Thus, though an interconnection 225 may be provided between two adjacent nodes 220 no valid interconnection may exist in one of the selection directions, in this example, from right to left, after already selecting nodes 230 from the left to the right. Hence, the validation process can be based on the order in which the user selects the nodes 220. As another example, an invalid edge 225 may be where, from the digitation graph, no interconnection or no active interconnection exists between to otherwise adjacent nodes 220. Put more simply, an invalid edge or connection may mean a scenario where no digital path from one node 220 to another node 220 exists for one reason or another.

Once the candidate route has been validated the route requirements for the selected route can be accessed by the user via the user interface 160.

As shown in FIG. 2, the properties for accessing may be provided on an interactive landing 240. The interactive landing 240 may be displayed automatically after the validation process. Alternatively, the user may provide an input to the user interface 160 to cause the interactive landing 240 to appear. According to one or more embodiments, the interactive landing 240 may be overlain on a part of the map 210 such as shown in FIG. 2.

Generally, the interactive landing 240 can show a so-called landing page of the route properties. Here, the retrieved route properties can be existing route properties if already set by default or previous user access. According to one or more embodiments, the route properties shown in the interactive landing 240 may be specific to the selected route. For example, depending upon the selected route, not all available route properties may be accessible. As an example, the following route properties for the selected route may be shown on interactive landing 240: Hint Override, Maximum Gear, and Throttle Limit. However, embodiments of the disclosed subject matter are not so limited and may additionally or alternatively include gear, speed, maximum speed, passage justification or bias for traversing the passage or passages 112 and/or other route requirements.

Such interactive landing 240 may constitute or be characterized as an option to access (e.g., view and/or modify) one or more of the route requirements for the selected route. For instance, according to one or more embodiments, the current route properties, particularly the respective requirements thereof, may be expressly shown with the individual selection of input(s) 245(1)-245(n), where n is zero (i.e., only one selection input 245(1)) or a positive integer. Additionally, according to one or more embodiments, the interactive landing 240 may have selection inputs 242 and 244 to access (e.g., apply) the route properties for both directions of travel for the selected route in the case of selection input 242 and to toggle the route properties for the direction of travel for the selected route in the case of selection input 244.

Optionally, the route properties can be specific to a particular operating mode for the work machines 102 through the mine site. For instance, the route properties can be specific for a fully autonomous or autopilot mode or a partially autonomous or co-pilot mode. The accessible properties and/or the corresponding requirements for the route properties may be different depending upon the mode. For instance, for the co-pilot mode an operator of the work machine 102 may merely have access to speed and direction control, whereas the remaining control is performed fully autonomously based on the requirements for corresponding route properties. Likewise, even the control available to the operator can be subject to the requirements for corresponding route properties.

Figure 4:
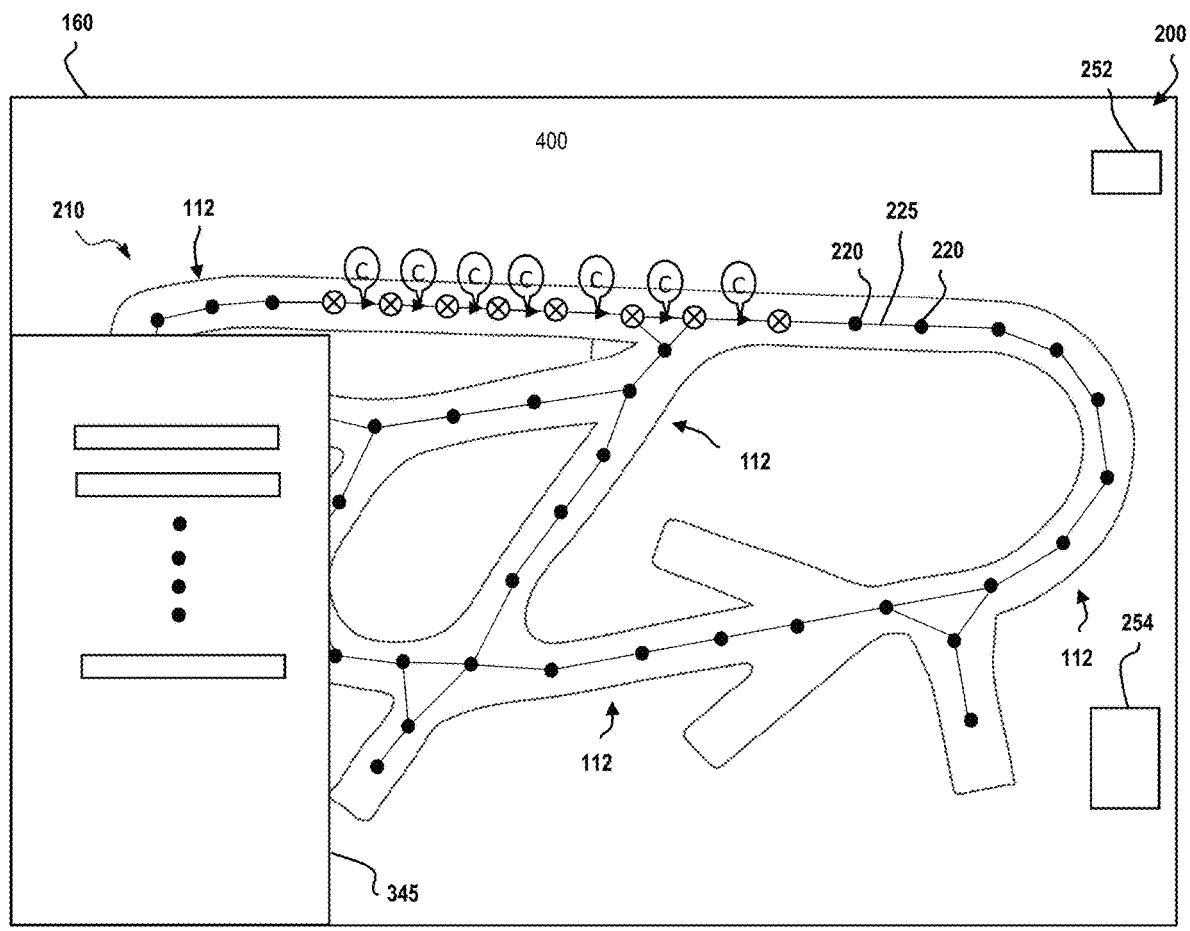
FIG. 4 shows an exemplary route requirement for a selected route according to one or more embodiments of the disclosed subject matter.

Specific access upon selecting one of the selection inputs 245(1)-245(n), via the user interface 160, can bring up requirement options for the respective route properties. Notably, the currently selected requirement can be shown in the respective requirement landings 345 as generally shown in FIG. 4. For instance, FIG. 4 may show that the current requirement for Hint Override is "Centre (C)." Additional non-limiting examples including the requirement landing 345 showing the current requirement for Maximum Gear as "Third Gear" or the current requirement for Throttle Limit as maximum, i.e., 100%. According to one or more embodiments, each requirement landing, such as requirement landings 345 may present over a portion of the map 210, such as shown in FIG. 4.

According to one or more embodiments, the route properties can be accessed one-at-a-time per route property. Notably, the route requirements can be shown also on the actual map 210, particularly on or adjacent to the selected route. For instance, the route requirements may be indicated for each edge 225, such as shown in FIG. 4. For instance, FIG. 4 shows 'C' corresponding to requirement "Centre (C)" adjacent or on each edge 225. Other examples include, but are not limited to, showing '3' corresponding to "Third Gear" adjacent or on each edge 225 or showing '100%' corresponding to 100% Throttle Limit adjacent or on each edge 225. Hence, according to one or more embodiments of the disclosed subject matter, the current requirements for the selected route can be shown on an interconnection-by-interconnection basis. Moreover, the current requirements for the selected route can be shown individually, for instance, as the indicated individual indicia representative of the currently viewed requirement, without displaying any of the other properties or associated information (e.g., selection inputs and/or individual indicia for the edges 225). However, via the user interface 160, the user can switch between the individual views of the route properties, i.e., switch between the requirement landings 345 for the different route properties. According to one or more embodiments, the individual indicia for the selected requirement can be characterized as an overlay on the map 210, for instance, in the passage 112 in association with the edge 225.

Via a particular requirement landing for a particular route property, such as requirement landing 345 in FIG. 4, the user can set, for instance, change, one or more requirements of the route properties. For instance, using the requirement landing 345, the user may set the Hint Override setting to "Hard Left (HL)," as an example, to change the requirement from "Center (C)." As another example, the user, via the requirement landing 345, may set the Maximum Gear setting to "First Gear," to change the Maximum Gear from "Third Gear," or the user may set, via the requirement landing 345, the Throttle Limit to a value less than 100%, for instance, 75%, as an example.

Setting each individual requirement, in this case changing the requirement, can cause indicia corresponding to the selected requirement to be displayed on the map 210. For instance, selecting the requirement "Hard Left (HL)" can cause 'HL' to be displayed in place of 'C' in FIG. 4; selecting the requirement "First Gear" can cause '1' to be displayed in place of '3'; and modifying the "Throttle Limit" can cause the selected throttle percentage to be displayed in place of '100%.' Such display of indicia can be in real time in response to the selection at the respective requirement landing 345 on the user interface 160. Thus, user interface 160 can display a dynamically changing requirement responsive to inputs to the user interface 160 to change the requirement. Changing one or more requirements for corresponding one or more route properties may be characterized as a modified requirement.

According to one or more embodiments, the indicia for the requirements shown on the graphic 200 of the user interface 160 can be automatically sized and/or placed within the graphic 200. For instance, the indicia for the requirements can be automatically sized based on the number of valid nodes 220 and edges 225 of the selected route, the amount of zoom, the size of the map 210, and/or the size of the display of the user interface 160. Here, the processor 156 of the control station 108 can determine how and/or where the indicia for the requirements is to be displayed in the graphic 200, for instance, based on the number of valid nodes 220 and edges 225 of the selected route, the amount of zoom, the size of the map 210, and/or the size of the display of the user interface 160. Such display, even when the amount of zoom changes and/or the size of the map 210 changes, can be such that adjustments to sizing, positioning, and/or form ensures the indicia do not overlap with each other. Optionally, the indicia can automatically align, for instance, remain centered at a middle or center portion of the edge 225. Thus, the processing performed by the processor 156 of the control station 108 regarding magnification can be such that the readability of the route properties is retained at varying magnification levels.

Referring again to FIG. 2, as noted above, the user interface 160 can provide, as part of the graphic 200, selection inputs 242 and 244 to access (e.g., view and/or apply) the route properties for both directions of travel for the selected route in the case of selection input 242 and to toggle the route properties for the direction of travel for the selected route in the case of selection input 244. Selection input 244 can be selected via input to the user interface 160 to change the direction of the selected route. Notably, the arrows between the nodes 220 can change direction. Thus, the selection input 244 can be used to toggle the direction of travel associated with the selected route. An input on the user interface 160 to selection input 242 can cause the system to associate both directions for the selected route. Such selection may cause the arrows between the nodes 220 to become bidirectional or disappear, as examples. The route properties and/or requirements for the route properties may be the same or different for different directions of travel for the selected route. Thus, the user may set one requirement for one route property for one direction of travel and may set another requirement for the same route property for the other direction of travel.

According to one or more embodiments, the graphic 200 may display a requirement landing associated with bias regarding the travel of the work machines 102 through the passage 112 associated with the selected route. For instance, the "Bias" setting may define whether the machines 102 can travel at the center of the passage or toward the left or right walls of the passage 112. Optionally, the bias setting can be specific to the direction of travel through the passage 112. For instance, graphic 200 may show the bias for traveling from left to right as being toward the right (or bottom) wall of the passage 112, whereas the bias for traveling from right to left can be shown as being toward the left (or top) wall of the passage 112. That is, in this example, the graphic may show two distinct arrows going in opposite directions of travel and biased toward the opposite walls of the passage 112. Thus, multiple work machines 102 going in opposite directions through the selected route may be controlled according to the bias such that the work machines 102 can pass each other two-wide, for instance, along the selected route.

Setting the requirements for the route properties at the control station 108 may not necessarily automatically enact the settings for future control of the work machines 102 as the work machines 102 traverse the mine site. For instance, the user, via the user interface 160, may need to actively send the settings. However, optionally, prior to sending the settings the user may wish to simulate the settings as applied to the work machines 102 and the selected route. If the settings are not acceptable the user can discard the settings and start anew via the user interface 160. For the simulation the set requirements for the route properties may be so-called sticky, meaning the requirements may remain in place after the simulation. Alternatively, the set requirements may reset to an immediately previous version if the newly set requirements are not accepted after the simulation. According to one or more embodiments, the simulation may show one or more work machines 102 traversing the selected route of the mine site.

In any case, the set requirements for the route properties for the selected route, whether set initially or due to an update or modification, can be output from the control station 108. As noted above, the user, via the user interface 160, can actively send the settings. Moreover, such settings can be outputted to the work machines 102 directly or indirectly via the localization platform 106 and/or the communication infrastructure 104.

Here, an input to the input 255 of the user interface 160 can cause the control station 108 to characterize the set and accepted requirements for the route properties for the selected route as current route requirements. Activation of such input 255 may also output the settings for later control of the work machines 102 as the work machines 102 traverse the selected route. The settings, or control data based thereon, may also be saved locally in the memory 152 of the control station 108 and/or in the storage device 110, or even additionally or alternatively in the localization platform 106 and/or the communication infrastructure 104 upon activation of input 255. Optionally, the settings, or control data based thereon, may be saved in each work machine 102.

The work machines 102 can be controlled (again, fully or partially autonomously) through the mine site according to the requirements for the route properties for one or more selected routes for which requirements have been set. Such control may be without control signaling from the control station 108. Thus, according to one or more embodiments, even in a case where the control of the work machine 102 through the mine site is partially autonomous, another control device different from the control station 108 may be used for the control. Alternatively, the control station 108 may be used to actively control one or more of the work machines 102 in real time based on the set requirements for the route properties for one or more selected routes for which requirements have been set.

INDUSTRIAL APPLICABILITY

As noted above, the present disclosure relates to present disclosure relates to accessing properties for control of work machines operating at a mine site, and more particularly to systems, methods, and apparatuses to select and set route properties for operation of work machines at the mine site when the work machines traverse the route(s).

For instance, at mine sites (e.g., underground mine sites), there can be predefined characteristics of a route that a work machine may need to adhere to when the work machine performs various actions when commanded autonomously or from a remote location. These properties may play a role in determining machine, infrastructure, and operator safety, as they may differ with different segments of routes and on bidirectional travel.

The mine site may have been surveyed to identify and define the passages 112. However, the surveyed passages may not (or may not sufficiently) indicate or even include on the map 210 infrastructural qualities not incorporated (or not yet incorporated) into the survey and hence the map 210, such as whether a feature or characteristic associated with the passage(s) 112 has changed since the survey.

According to embodiments of the disclosed subject matter, the user (e.g., mine site supervisor) can access the user interface 160 to define operating modes for the work machines 102 for various portions of the passages 112.

A digitation graph comprised of a plurality of points through the passages 112 of what the autonomy system (which can include the work machines 102) thinks a route is between two points can be generated by or for the autonomy system and provided on the user interface 160 in the form indicia such as dots 220. Interconnections 225 between the dots 220 can be represented by indicia such as straight lines, for instance, as shown in FIG. 2. The dots 220 and the interconnections 225 may be referred to, characterized as and/or correspond to logical nodes 220 and edges 225, respectively, which, discussed in more detail below, can govern the symbolization of the generated route.

Generally, embodiments of the disclosed subject matter can allow the user to select a portion/entire route to display generated route properties. Embodiments of the disclosed subject matter can further allow the user to change and apply the properties of the route.

According to one or more embodiments, a system, method, and apparatus can access, via a user interface, route properties of a mine site used for controlling one or more work machines as the work machine(s) travel through the mine site. Access regarding the route properties can include viewing one or more of the properties and/or setting requirements (e.g., restrictions or limitations) for one or more of the properties. A candidate route can be selected, validated, and set as a selected route using the user interface to access route properties associated with the selected route. Requirements can be set for one or more of the route properties using the user interface. The work machines can be controlled to traverse the mine site according to the requirements set for the route properties.

According to one or more embodiments, the user interface can allow a view of the generated route of the entire operational area. Embodiments can further include an algorithm that helps the user to select a portion/entire route to display generated route properties. Logical nodes and edges can govern the symbolization of the generated route. The user can be able to see a localized view of an interesting portion of the route. Furthermore, the user can change and apply properties of the route such as low of high gear, throttle, hints, bias, and attributes related to machine travel in both directions. The user would be able to see the properties dynamically change when the change is being made. On user satisfaction, the changes can be applied permanently on the selected route.

Figure 5:
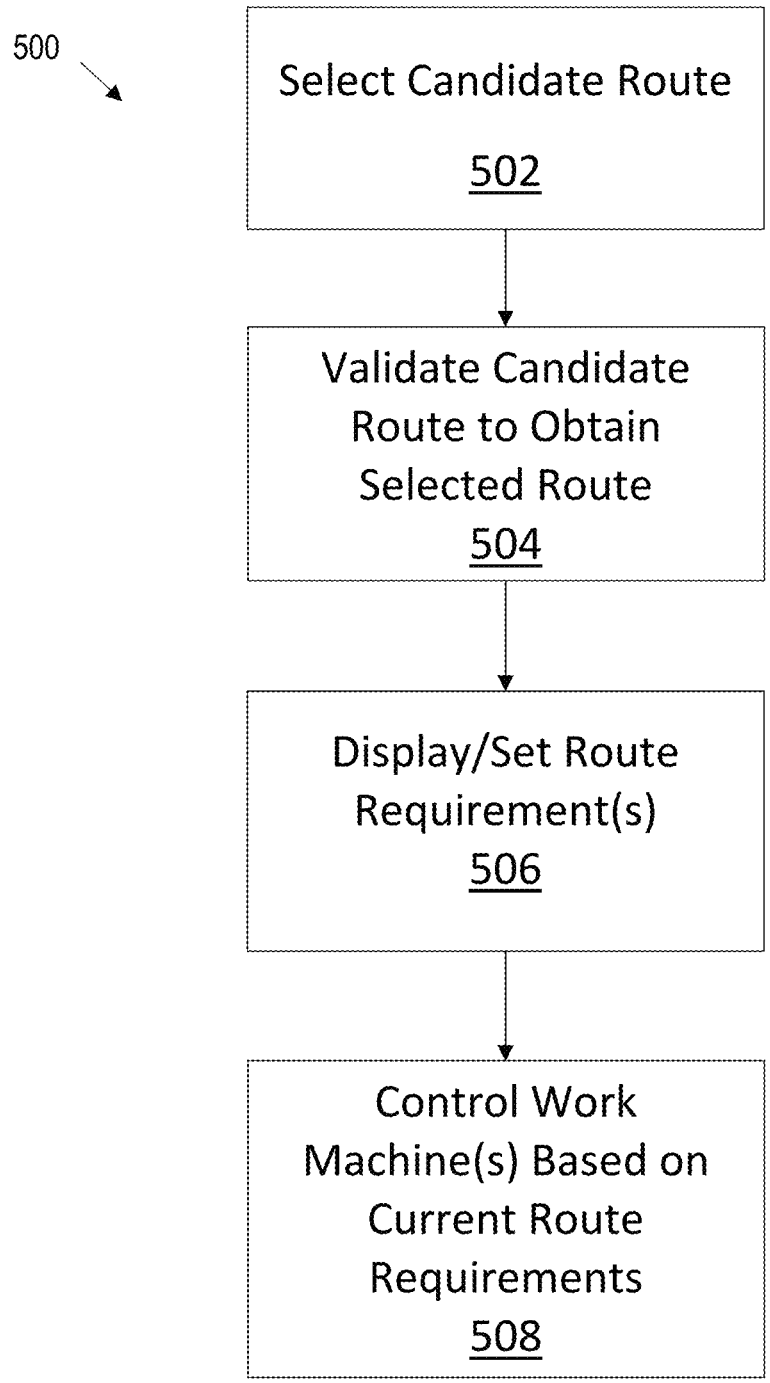
FIG. 5 is a flow chart of a method according to one or more embodiments of the disclosed subject matter.

Turning to FIG. 5, FIG. 5 is a flow chart of a method 500 according to one or more embodiments of the disclosed subject matter. Some or all of the method 500 can be performed using a non-transitory computer-readable storage medium having stored thereon instructions that, when executed by one or more processors (e.g., one or more electronic processors of the control station 108), cause the one or more processors to perform the method 500.

At operation 502 the method 500 can involve selection of a candidate route through a work site such as a mine site. As noted above, the selection can be performed using a user interface, such as user interface 160. Such selection can involve some or all of the nodes 220 and edges 225 as described above, for instance, with respect to FIG. 2.

At operation 504 the method 500 can include performing, via a processor (e.g., processing circuitry) of a control station, such as control station 108, a validation process for the nodes 220 and edges 225 of the candidate route. The validation process may keep valid edges 225 and nodes 220 and discard any invalid edges 225 and nodes 220. The valid edges 225 and nodes 220 may remain displayed on the graphic 200 of the user interface 160 such as described above. The remaining valid edges 225 and nodes 220 may be referred to as a selected route.

At operation 506 the method 500 can include accessing route properties associated with the selected route. Access to the requirements for the route properties can include viewing the requirements. Hence, the user can access the requirements to understand current built-in parameters, if currently any, for autonomous operation of the work machines 102 about the mine site. Such viewing may also be to identify what route properties are even modifiable with requirements for a given part of the mine site or the entirety of the mine site. Access can additionally or alternatively include setting one or more parameters for the requirements for some or all of the mine site, such as some or all of the passages 112 in the mine site shown in FIG. 2. Such setting may also be to apply or remove application of some or all of the requirements. The user interface 160 can be operational to receive inputs in this regard to access the route properties and hence set the requirements for select portions of the mine site (including all of the mine site).

The method 500 may optionally or alternatively include operation 508. The method 500, for operation 508, can include controlling one or more work machines, such as one or more work machines 102, according to set requirements for route properties set using the user interface 160. Such control may be based on output of the settings from the control station 108, for instance, and received directly or indirectly by the work machines 102, when the work machines 102 traverse the selected route.

As used herein, the term "circuitry" can refer to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory(ies) that work together to cause an apparatus, such as a server, to perform various functions); and (c) to circuits, such as a microprocessor(s) or a portion of a microprocessor(s), that require software or firmware for operation, even if the software or firmware is not physically present.

Embodiments of the disclosed subject matter can also be as set forth according to the following parentheticals.

(1) A system for selecting and applying route requirements for work machines traversing passages of an underground mine, the system comprising: a graphical user interface to receive inputs from a user and display mappings of the underground mine including the passages; and control circuitry, operative with the graphical user interface, configured to responsive to input to the graphical user interface by the user selecting a candidate route through one or more of the passages displayed on the graphical user interface, determine, in real time, whether any portion of the candidate route is invalid based on prior knowledge of valid nodes and interconnections between adjacent ones of the valid nodes associated with the candidate route and rejecting any portion of the candidate route determined to be invalid, set as a selected route all portions of the candidate route determined to be valid by way of exclusion of said any portion of the candidate route determined to be invalid, responsive to input to the graphical user interface by the user to modify at least one of the route requirements, control display, in real time, of the modified at least one route requirement on the graphical user interface, and responsive to input to the graphical user interface by the user to confirm the modified at least one route requirement, set the modified at least one route requirement as part of current route requirements for the work machines traversing the selected route.

(2) The system according to (1), wherein the control circuitry and the graphical user interface are part of an electronic mobile, handheld mine site tool or a customized industrial display, wherein the system further comprises communication circuitry of each of the work machines to receive signaling output from the control circuitry of the electronic mobile, handheld mine site tool either directly or indirectly from the electronic mobile, handheld mine site tool, to apply the current route requirements for future operation of the work machines when the work machines traverse the selected route, and wherein each of the work machines is an autonomous work machine.

(3) The system according to (1) or (2), further comprising communication infrastructure circuitry at the underground mine, different from the electronic mobile, handheld mine site tool and the communication circuitry of the work machines, to receive the signaling output from the control circuitry of the electronic mobile, handheld mine site tool and output signaling to the work machines to control the future operation of the work machines according to the current route requirements when the work machines traverse the selected route.

(4) The system according to any one of (1) to (3), wherein the control circuitry is configured to control the display of the current route requirements of the selected route, prior to and/or after modifying said at least one of the route requirements, by automatically sizing information corresponding to the route requirements displayed on the graphical user interface in correspondence with an amount of enlargement of the mapping having the selected route.

(5) The system according to any one of (1) to (4), wherein the route requirements include gear, maximum gear, speed, maximum speed, throttle limit, hint, and/or passage justification or bias for traversing the passage or passages.

(6) The system according to any one of (1) to (5), wherein the control circuitry is configured to control display of the current route requirements on a one-at-a-time basis for a selected one of the current route requirements selected by the user on the graphical user interface.

(7) The system according to any one of (1) to (6), wherein the control circuitry is configured to apply the modified at least one current route requirement to one direction of travel or both directions of travel for the selected route based on input to the graphical user interface by the user selecting the one direction or both directions.

(8) The system according to any one of (1) to (7), wherein in a case of one direction of travel, the modified at least one of the current route requirement is different for a first direction of travel compared to the at least one current route requirement for a second direction of travel opposite the first direction of travel.

(9) The system according to any one of (1) to (8), wherein the selected candidate route includes an entirety of the nodes and interconnections for all of the passages of the underground mine.

(10) A method for selecting and applying route requirements for work machines traversing predetermined passages of a mine site comprising: selecting, via a user interface provided on a display of a mobile, handheld mine site tool, a candidate route through one or more of the predetermined passages of the mine site displayed on a map of the mine site; validating, using a processor of the mobile, handheld mine site tool, the candidate route based on prior knowledge of valid nodes and edges between adjacent ones of the valid nodes associated with the candidate route; setting as a selected route, using the processor of the mobile, handheld mine site tool, only portions of the candidate route determined to be valid; and controlling display of, on the display of the mobile, handheld mine site tool, using the processor of the mobile, handheld mine site tool, a modified route requirement for one of the plurality of route requirements for the selected route responsive to selection and setting of the route requirement in response to input via the user interface, wherein the modified route requirement displayed on the display of the mobile, handheld mine site tool is displayed as an overlay on the map and shows individual indicia for the route requirement on each of the valid edges of the selected route.

(11) The method according to (10), wherein the individual indicia for each of the route requirements are displayed on the map without displaying individual indicia for any of the other route requirements, and wherein the method further comprises changing, under control of the processor of the mobile, handheld mine site tool, from display of the individual indicia for one of the route requirements to display of the individual indicia for another of the route requirements in response to input to the user interface.

(12) The method according to (10) or (11), further comprising: responsive to input to the user interface to select and set the route requirement, outputting, using the processor of the mobile, handheld mine site tool, signaling from the mobile, handheld mine site tool to control the work machines according to the modified route requirement when the work machines traverse the selected route; and controlling the work machines according to the modified route requirement when the work machines traverse the selected route, said controlling being autonomous, fully or partially, without control signaling from the mobile, handheld mine site tool.

(13) The method according to any one of (10) to (12), wherein said validating includes invalidating any portion of the candidate route that reverses a direction of selection such that a previously selected valid node is selected again during a same iteration of said selecting.

(14) The method according to any one of (10) to (13), further comprising: applying, using the processor of the mobile, handheld mine site tool, the modified route requirement to one direction of travel or both directions of travel for the selected route responsive to input to the user interface selecting the one direction or both directions; and displaying, on the display of the mobile, handheld mine site tool, the modified route requirement for one or both directions, wherein in a case of one direction of travel, the modified route requirement is different for a first direction of travel compared to the route requirement for a second direction of travel opposite the first direction of travel.

(15) A non-transitory computer-readable storage medium having stored thereon instructions that, when executed by one or more processors, cause the one or more processors to perform a method comprising: processing an input to a graphical user interface to select a candidate route through one or more of the passages of a mine site displayed on a map of the mine site; determining whether any portion of the candidate route is invalid based on prior knowledge of nodes and interconnections between adjacent ones of the nodes associated with the candidate route; setting as a selected route all portions of the candidate route determined to be valid; controlling display of, on the graphical user interface, an option to set one or more of a plurality of route requirements to control operation of work machines according to the route requirements when the work machines traverse the selected route; and controlling display of, on the graphical user interface, at least one of the one or more route requirements set in response to input via the graphical user interface, wherein the set at least one of the route requirements is displayed on the graphical user interface as an overlay on the map for each of the interconnections of the selected route.

(16) The non-transitory computer-readable storage medium according to (15), wherein each of the route requirements is displayed on the map of the underground mine on an individual basis without displaying any of the other route requirements, and wherein the method further comprises changing from display of one of the route requirements in a favor of another of the route requirements in response to input to the graphical user interface.

(17) The non-transitory computer-readable storage medium according to (15) or (16), wherein the method further comprises, responsive to input to the graphical user interface, outputting control signaling to control the work machines according to all of the one or more route requirements set in response to said input via the graphical user interface, said control signaling data regarding any route requirements not set in response to said input via the graphical user interface.

(18) The non-transitory computer-readable storage medium according to any one of (15) to (17), wherein the method further comprises controlling the work machines according to all set route requirements for the selected route, whether previously set or currently set in response to said input via the graphical user interface.

(19) The non-transitory computer-readable storage medium according to any one of (15) to (18), wherein the method further comprises: applying the set one or more route requirements to one direction of travel or both directions of travel for the selected route responsive to input to the graphical user interface selecting the one direction or both directions; and displaying, on the graphical user interface, the set one or more route requirements for one or both directions.

(20) The non-transitory computer-readable storage medium according to any one of (15) to (19), further comprising displaying the route requirements according to automatic sizing of information corresponding to the route requirements on the graphical user interface in correspondence with an amount of enlargement of the selected route on the map.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

What is claimed is:

1. A system for selecting and applying route requirements for work machines traversing passages of an underground mine, the system comprising:
   a graphical user interface to receive inputs from a user and display mappings of the underground mine including the passages; and
   control circuitry comprising a processor, operative with the graphical user interface, configured to:
      responsive to an input to the graphical user interface selecting a candidate route through one or more of the passages displayed on the graphical user interface:
         determine, in real time, whether one or more portions of the candidate route is invalid based on prior determination, by the processor, of valid nodes and interconnections between adjacent ones of the valid nodes associated with the candidate route, and
         reject the one or more portions of the candidate route determined to be invalid,
      set, as a selected route, portions of the candidate route determined to be valid by excluding, from the selected route, the one or more portions of the candidate route determined to be invalid,
      responsive to an input to the graphical user interface to modify at least one of the route requirements, control, in real time, a display of the modified at least one of route requirements on the graphical user interface, and
      responsive to an input to the graphical user interface to confirm the modified at least one of route requirements, set the modified at least one of route requirements as part of current route requirements for the work machines traversing the selected route.

2. The system according to claim 1,
   wherein the control circuitry and the graphical user interface are part of an electronic mobile, handheld mine site tool or a customized industrial display,
   wherein the system further comprises communication circuitry of each of the work machines to receive signaling output from the control circuitry of the electronic mobile, handheld mine site tool either directly or indirectly from the electronic mobile, handheld mine site tool, to apply the current route requirements for future operation of the work machines when the work machines traverse the selected route, and
   wherein each of the work machines is an autonomous work machine.

3. The system according to claim 2, further comprising communication infrastructure circuitry at the underground mine, different from the electronic mobile, handheld mine site tool and the communication circuitry of the work machines, to receive the signaling output from the control circuitry of the electronic mobile, handheld mine site tool and output signaling to the work machines to control the future operation of the work machines according to the current route requirements when the work machines traverse the selected route.

4. The system according to claim 1, wherein the control circuitry is configured to control a display of the current route requirements of the selected route, prior to and/or after modifying the at least one of the route requirements, by automatically sizing information corresponding to the route requirements displayed on the graphical user interface in correspondence with an amount of enlargement of the mapping having the selected route.

5. The system according to claim 1, wherein the route requirements include gear, maximum gear, speed, maximum speed, throttle limit, hint, and/or passage justification or bias for traversing the passage or passages.

6. The system according to claim 1, wherein the control circuitry is configured to control display of the current route requirements on a one-at-a-time basis for a selected one of the current route requirements selected on the graphical user interface.

7. The system according to claim 1, wherein the control circuitry is configured to apply the modified at least one of route requirements to one direction of travel or both directions of travel for the selected route based on an input to the graphical user interface selecting the one direction or both directions.

8. The system according to claim 7, wherein in a case of the one direction of travel, the modified at least one of route requirements is different for a first direction of travel compared to the at least one of route requirements for a second direction of travel opposite the first direction of travel.

9. The system according to claim 1, wherein the selected candidate route includes an entirety of the nodes and interconnections for all of the passages of the underground mine.

10. A method for selecting and applying route requirements for work machines traversing predetermined passages of a mine site comprising:
selecting, via a user interface provided on a display of a mobile, handheld mine site tool, a candidate route through one or more of the predetermined passages of the mine site displayed on a map of the mine site;
validating, using a processor of the mobile, handheld mine site tool, the candidate route based on prior determination, by the processor, of valid nodes and edges between adjacent ones of the valid nodes associated with the candidate route;
setting as a selected route, using the processor, handheld mine site tool, one or more portions of the candidate route determined to be valid; and
controlling, on the display of the mobile, handheld mine site tool, using the processor, handheld mine site tool, a display of a modified route requirement for one of a plurality of route requirements for the selected route responsive to selection and setting of the modified route requirement in response to a first input via the user interface,
wherein the modified route requirement displayed on the display of the mobile, handheld mine site tool is displayed as an overlay on the map and shows individual indicia for the modified route requirement on each of the valid edges of the selected route.

11. The method according to claim 10,
wherein the individual indicia for the modified route requirement are displayed on the map without displaying individual indicia for route requirements other than the modified route requirement, and
wherein the method further comprises changing, under control of the processor, handheld mine site tool, from display of the individual indicia the modified route requirement to display of individual indicia for another route requirement of the route requirements in response to a second input to the user interface.

12. The method according to claim 10, further comprising:
responsive to a third input to the user interface to select and set the modified route requirement, outputting, using the processor, handheld mine site tool, signaling from the mobile, handheld mine site tool to control the work machines according to the modified route requirement when the work machines traverse the selected route; and
controlling the work machines according to the modified route requirement when the work machines traverse the selected route, the controlling being autonomous, fully or partially, without control signaling from the mobile, handheld mine site tool.

13. The method according to claim 10, wherein the validating includes invalidating any portion of the candidate route that reverses a direction of selection such that a previously selected valid node is selected again during a same iteration of the selecting.

14. The method according to claim 10, further comprising:
applying, using the processor, handheld mine site tool, the modified route requirement to one direction of travel or both directions of travel for the selected route responsive to a fourth input to the user interface selecting the one direction or both directions; and
displaying, on the display of the mobile, handheld mine site tool, the modified route requirement for one or both directions,
wherein in a case of one direction of travel, the modified route requirement is different for a first direction of travel compared to the route requirement for a second direction of travel opposite the first direction of travel.

15. A non-transitory computer-readable storage medium having stored thereon instructions that, when executed by one or more processors, cause the one or more processors to perform a method comprising:
processing a first input to a graphical user interface to select a candidate route through one or more of the passages of a mine site displayed on a map of the mine site;
determining whether one or more portions of the candidate route is invalid based on prior determination, by the one or more processors, of valid nodes and interconnections between adjacent ones of the valid nodes associated with the candidate route;
setting, as a selected route, portions of the candidate route determined to be valid;
controlling a display, on the graphical user interface, of an option to set one or more route requirements of a plurality of route requirements to control operation of work machines according to the plurality of route requirements when the work machines traverse the selected route; and
controlling a display, on the graphical user interface, of at least one route requirement of the one or more route requirements in response to a second input via the graphical user interface,
wherein the at least one route requirement is displayed on the graphical user interface as an overlay on the map for each of the interconnections of the selected route.

16. The non-transitory computer-readable storage medium according to claim 15,
wherein each route requirement of the plurality of route requirements is displayed on the map of the underground mine on an individual basis without displaying any of the other route requirements, and wherein the method further comprises changing from the display of the at least one route requirement to a display of another route requirement of the plurality of route requirements in response to a third input to the graphical user interface.

17. The non-transitory computer-readable storage medium according to claim 15, wherein the method further comprises, responsive to a fourth input to the graphical user interface, outputting control signaling to control the work machines according to the one or more route requirements.

18. The non-transitory computer-readable storage medium according to Claim 15, wherein the non-transitory computer-readable storage medium and the one or more processors are part of an electronic mobile, handheld mine site tool or a customized industrial display.

19. The non-transitory computer-readable storage medium according to claim 15, wherein the method further comprises:
   applying the one or more route requirements to one direction of travel or both directions of travel for the selected route responsive to a fifth input to the graphical user interface selecting the one direction or both directions; and
   displaying, on the graphical user interface, the one or more route requirements for one or both directions.

20. The non-transitory computer-readable storage medium according to claim 15, further comprising displaying the one or more route requirements according to automatic sizing of information corresponding to the one or more_route requirements on the graphical user interface in correspondence with an amount of enlargement of the selected route on the map.

\* \* \* \* \*